US012650258B2

(12) United States Patent
Jung et al.

(10) Patent No.: US 12,650,258 B2
(45) Date of Patent: *Jun. 9, 2026

(54) VACUUM ADIABATIC BODY AND REFRIGERATOR

(71) Applicant: LG ELECTRONICS INC., Seoul (KR)

(72) Inventors: Wonyeong Jung, Seoul (KR); Daewoong Kim, Seoul (KR); Hyeunsik Nam, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,139

(22) Filed: Jun. 29, 2023

(65) Prior Publication Data

US 2023/0349626 A1 Nov. 2, 2023

Related U.S. Application Data

(63) Continuation of application No. 16/980,349, filed as application No. PCT/KR2019/007678 on Jun. 25, 2019, now Pat. No. 11,740,008.

(30) Foreign Application Priority Data

Jun. 27, 2018 (KR) ........................ 10-2018-0074172

(51) Int. Cl.
*F25D 11/00* (2006.01)
*F16L 59/065* (2006.01)
(Continued)

(52) U.S. Cl.
CPC .......... *F25D 23/061* (2013.01); *F16L 59/065* (2013.01); *F25D 11/02* (2013.01)

(58) Field of Classification Search
CPC .. F25D 11/02; F25D 2201/12; F25D 2201/14; F25D 23/02; F25D 23/06; F25D 23/063; F25D 23/069; F25D 2600/04
See application file for complete search history.

(56) References Cited

U.S. PATENT DOCUMENTS

| | | | |
|---|---|---|---|
| 2,000,882 A | 5/1935 | Comstock | |
| 2,617,551 A | 11/1952 | Hopkins | |
| (Continued) | | | |

FOREIGN PATENT DOCUMENTS

| | | |
|---|---|---|
| CN | 1636707 | 7/2005 |
| CN | 201373644 | 12/2009 |
| (Continued) | | |

OTHER PUBLICATIONS

International Search Report and Written Opinion dated Sep. 25, 2019 issued in Application No. PCT/KR2019/007678.
(Continued)

*Primary Examiner* — Filip Zec
(74) *Attorney, Agent, or Firm* — KED & ASSOCIATES, LLP

(57) ABSTRACT

In one embodiment, a refrigerator includes: a heat exchange pipeline which is accommodated in an inner wall of a vacuum adiabatic body and in which heat exchange of a refrigerant is performed; a through-part through which a refrigerant pipe provided in at least one of the first plate member or the second plate member to provide the heat exchange pipeline passes; and a sealing member configured to accommodate the inlet pipe and the outlet pipe therein and coupled to at least one of the first plate member or the second plate member to restrict gas communication between the refrigerant pipe and the vacuum space part.

20 Claims, 20 Drawing Sheets

(51) Int. Cl.
    *F25D 11/02*         (2006.01)
    *F25D 23/06*         (2006.01)

(56)         References Cited

U.S. PATENT DOCUMENTS

| | | | | |
|---|---|---|---|---|
| 5,082,335 | A * | 1/1992 | Cur | F25D 23/062 |
| | | | | 62/DIG. 13 |
| 5,869,407 | A * | 2/1999 | Rusek, Jr. | B32B 15/14 |
| | | | | 442/140 |
| 5,924,629 | A | 7/1999 | Kobayashi | |
| 7,571,582 | B2 * | 8/2009 | Hirai | F16L 59/065 |
| | | | | 428/69 |
| 7,762,634 | B2 * | 7/2010 | Tenra | B32B 7/12 |
| | | | | 312/5 |
| 8,365,551 | B2 | 2/2013 | Hanley et al. | |
| 8,765,247 | B2 * | 7/2014 | Park | E04B 1/803 |
| | | | | 428/69 |
| 9,233,791 | B2 | 1/2016 | Bushnell | |
| 9,527,653 | B2 | 12/2016 | Kerspe | |
| 9,689,604 | B2 * | 6/2017 | Wu | B32B 37/10 |
| 11,022,365 | B2 * | 6/2021 | Heo | F25D 23/028 |
| 2005/0144904 | A1 | 7/2005 | Veltkamp | |
| 2006/0223351 | A1 * | 10/2006 | Kim | H01R 13/743 |
| | | | | 439/157 |
| 2007/0051125 | A1 | 3/2007 | Chiusolo | |
| 2007/0095092 | A1 | 5/2007 | Wuerfei, III | |
| 2008/0110128 | A1 | 5/2008 | Hirath | |
| 2010/0003578 | A1 | 1/2010 | Wahl | |
| 2010/0279055 | A1 | 11/2010 | Song | |
| 2011/0234074 | A1 * | 9/2011 | Dolinsek | H02G 3/04 |
| | | | | 62/340 |
| 2012/0060543 | A1 * | 3/2012 | Hanley | F16L 59/065 |
| | | | | 62/440 |
| 2013/0111942 | A1 | 5/2013 | Jung | |
| 2013/0256318 | A1 | 10/2013 | Kuehl | |
| 2014/0328023 | A1 | 11/2014 | Choi et al. | |
| 2015/0030800 | A1 | 1/2015 | Jung et al. | |
| 2015/0241114 | A1 * | 8/2015 | Wu | B29C 65/72 |
| | | | | 156/286 |
| 2016/0069595 | A1 | 3/2016 | Kim | |
| 2016/0130721 | A1 | 5/2016 | Chartier | |
| 2016/0290690 | A1 | 10/2016 | Jung et al. | |
| 2017/0176092 | A1 | 6/2017 | Naik | |
| 2017/0276287 | A1 | 9/2017 | Kawarazaki et al. | |
| 2018/0224193 | A1 | 8/2018 | Jung et al. | |
| 2018/0224195 | A1 | 8/2018 | Jung et al. | |
| 2018/0224197 | A1 | 8/2018 | Jung et al. | |
| 2018/0224198 | A1 | 8/2018 | Jung et al. | |
| 2019/0162356 | A1 * | 5/2019 | Allard | F25D 23/087 |
| 2020/0033049 | A1 | 1/2020 | Dherde et al. | |
| 2021/0199367 | A1 * | 7/2021 | Kim | E06B 3/6617 |

FOREIGN PATENT DOCUMENTS

| | | |
|---|---|---|
| CN | 101825378 | 9/2010 |
| CN | 103090630 | 5/2013 |
| CN | 205593277 | 9/2016 |
| CN | 107250649 | 10/2017 |
| CN | 206546057 | 10/2017 |
| CN | 107676845 | 2/2018 |
| CN | 107923698 | 4/2018 |
| CN | 107923699 | 4/2018 |
| CN | 107923701 | 4/2018 |
| EP | 2 589 905 | 5/2013 |
| JP | 2012-251704 | 12/2012 |
| KR | 10-0343719 | 6/2002 |
| KR | 10-2013-0049495 | 5/2013 |
| KR | 10-2014-0057305 | 5/2014 |
| KR | 10-2015-0012712 | 2/2015 |
| KR | 10-2017-0016186 | 2/2017 |
| KR | 10-2017-0016245 | 2/2017 |
| KR | 20200076460 A * | 5/2018 |
| KR | 10-2019-0070753 | 6/2019 |
| KR | 101858237 B1 * | 6/2020 |
| RU | 262967 | 9/2017 |
| RU | 2632941 | 10/2017 |
| WO | WO 2017/023094 | 2/2017 |
| WO | WO 2017/112114 | 6/2017 |
| WO | WO 2018/111235 | 6/2018 |

OTHER PUBLICATIONS

India Office Action dated Feb. 26, 2021 issued in IN Application No. 202017042587.
Russian Office Action dated Jul. 2, 2021 issued in Application No. 2020132153.
Chinese Office Action dated Jul. 16, 2021 issued in Application No. 201980023630.1.
European Search Report issued in Application No. 19824817.1 dated Feb. 8, 2022.
Chinese Office Action dated Apr. 4, 2023 issued in Application No. 202210936824.4.
Machine Translation of CN publication 103597304 of WO2012/169520 to Ono et al.; espacenet, description—Dec. 13, 2012.
Chinese Office Action dated Dec. 27, 2023, issued in Application No. 202210936824.4.
Russian Decision of Grant and Search Report dated Mar. 27, 25 issued in Application No. RU2022101341.

* cited by examiner

FIG. 4

| Group | | General plastic | | | | Engineering plastic | | | |
|---|---|---|---|---|---|---|---|---|---|
| Meaterial | | (HD)PE ※G-Plastic Reference | PC | Glass fiber PC (30% Glass-F) | ※Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | *151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength/Cond. | MPa·m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost (per 1kg) | | Low | $3.1 | $6.2(G/F20%) | $6.7 | High | $30 | $40 | $150 |

VACUUM ADIABATIC BODY AND REFRIGERATOR

CROSS-REFERENCE TO RELATED APPLICATIONS

This application is a continuation of U.S. patent application Ser. No. 16/980,349, filed Sep. 11, 2020, which is a U.S. National Stage Application under 35 U.S.C. § 371 of PCT Application No. PCT/KR2019/007678, filed Jun. 25, 2019, which claims priority to Korean Patent Application No. 10-2018-0074172, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body may suppress heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

Korean Patent No. 10-0343719 (Cited Document 1) of the present applicant discloses a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

To solve this problem, the present applicant had filed Korean Patent Application NO. 10-2013-0049495 (Cited Document 3). This technique provides a vacuum adiabatic body in an empty vacuum state without providing a separate adiabatic material therein. In addition, this technique provides a technique in which a heat exchange pipeline is provided in the vacuum adiabatic body. The heat exchange pipeline is a pipeline in which two pipelines, i.e., an inlet pipe of an evaporator and an outlet pipe of the evaporator contact each other. The heat exchange pipeline is a pipeline in which a refrigerant flowing through the inside of the two pipelines are heat-exchanged with each other to improve performance of a refrigerating cycle.

The heat exchange pipeline passes through the inside of the vacuum space part to extend to the outside and inside of the refrigerator. Thus, to maintain the vacuum state of the vacuum space part, a position at which the heat exchange pipeline passes through the vacuum space part and a plate inside the refrigerator and a position at which the heat exchange pipeline passes through the vacuum space part and a plate outside the refrigerator have to be sealed. To achieve the above objects, this applicant has disclosed a structure for sealing a separate pipeline of a branched heat exchange pipeline in FIGS. 17 and 18, which is disclosed in Korean Patent Application No. 10-2017-0171596 (Cited Document 4).

According to the cited document 4, to maintain the sealing, the two pipelines of the heat exchange pipelines may be branched to pass through the vacuum space part to cause four penetrated portions. However, as the number of penetrated portions increases, a heat loss may occur. Also, if there is a problem in sealing at any one portion, it is not preferable because it is difficult to maintain vacuum in the vacuum space part. Also, a welding part of the two pipelines may be exposed to the vacuum space part, and thus, a gas generated from the welding part may destroy the vacuum state of the vacuum space part.

In addition, a pressure loss of a refrigerant may occur due to a sharp bending angle of the branched point of each of the two pipelines constituting the heat exchange pipelines. The bending angle of the heat exchange pipeline more increases due to a pitch gap (about 200 mm) of the bar constituting the supporting unit. Also, since heterogeneous bonding is performed between a stainless material forming the vacuum space part and a copper material forming the heat exchange pipeline at the penetrated portion, it is difficult to carry out the work.

DISCLOSURE

Technical Problem

Embodiments provide a vacuum adiabatic body in which difficulty in work is solved at a portion at which a heat exchange pipeline passes through a vacuum space part, and the number of penetrated portions is reduced.

Embodiments also provide a vacuum adiabatic body in which a gas generated from a welding part of two pipelines constituting the heat exchange pipeline does not have an influence on an inner space of a vacuum space part.

Embodiments also provide a vacuum adiabatic body in which a pressure loss of a refrigerant due to sharp bending of a heat exchange pipeline is reduced.

Embodiments also provide a vacuum adiabatic body in which leakage and difficulty of work, which occur due to heterogeneous welding between a heat exchange pipeline and a vacuum space part, are solved.

Technical Solution

In one embodiment, a refrigerator may include a heat exchange pipeline which is accommodated in an inner wall of a vacuum adiabatic body and in which heat exchange of a refrigerant is performed, a through-part or opening through which a refrigerant pipe provided in at least one of the first plate member or the second plate member to provide the heat exchange pipeline passes, and a sealing member configured to accommodate the inlet pipe and the outlet pipe therein and coupled to at least one of the first plate member or the second plate member to restrict gas communication between the refrigerant pipe and the vacuum space part.

The sealing member may be used to reduce the number of welding parts or instances of welding so that work is convenient, reduce an adiabatic loss, reduce a pressure loss of the refrigerant flowing through the heat exchange pipeline, and improve difficulty of the work due to the welding of heterogeneous materials.

A filler may be added to the inside of the sealing member to prevent the refrigerant pipe from contacting a plate member, thereby reducing an adiabatic loss.

In another embodiment, a vacuum adiabatic body may include a first plate member configured to define at least a portion of a wall for a first space, a second plate member configured to define at least a portion of a wall for a second space having a temperature different from that of the first space a heat exchange pipeline including at least two pipelines placed in the third space and heat-exchanged with each other, and a single through-part or opening which is provided in at least one of the first plate member or the second plate member and through which the at least two pipelines pass together.

The number of weldings may be reduced to prevent a vacuum space part from leaking and realize convenient work.

In further another embodiment, a vacuum adiabatic body may include a first plate member configured to define at least a portion of a wall for a first space, a second plate member configured to define at least a portion of a wall for a second space having a temperature different from that of the first space a heat exchange pipeline provided in a third space so that at least two refrigerant pipes, through which different fluids flow, contact each other to be heat-exchanged a through-part through which a refrigerant pipe provided in each of the first plate member and the second plate member to provide a heat exchange pipeline passes and a sealing member configured to accommodate the at least two refrigerant pipes therein and welded to be coupled to at least one of the first plate member or the second plate member to restrict gas communication between the refrigerant pipe and the third space.

The refrigerant pipe of the vacuum space part may be supported through homogeneous welding to prevent leakage from occurring and realize more convenient work.

Advantageous Effects

According to the embodiments, the number of penetrated portions through which the heat exchange pipeline passes through the vacuum space part may be reduced to reduce inconvenience of work and a heat loss by half. In addition, there may be an advantage that vacuum breakage or deterioration of the vacuum space part is also reduced.

According to the embodiments, the welding part that is the contact part of the two pipelines constituting the heat exchange pipeline may not be exposed to the vacuum space part to prevent the gas within the vacuum space part from increasing, thereby improving the lifespan of the product.

According to the embodiments, since the separate branching of the pipeline is not required at the penetrated portion, and the necessary bending portion is smoothly bent, the pressure loss of the refrigerant may be reduced.

Since the heat exchange pipeline and the vacuum space part and/or plate members are bonded to each other through the homogeneous welding, the work may be convenient, and the reliability of the coupling and the sealing maintenance may be improved.

DESCRIPTION OF DRAWINGS

FIG. 4 is a diagram illustrating results obtained by examining resins.

MODE FOR INVENTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present disclosure.

The drawings shown below may be displayed differently from the actual product, or exaggerated or simple or detailed parts may be deleted, but this is intended to facilitate understanding of the technical idea of the present disclosure. It should not be construed as limited.

Also, the number of each of the components illustrated together with the drawings facilitates the understanding of the inventive concept by assigning the same or similar number to the same or similar component in function. Similarly, in the case of performing the same or similar function in function even if the embodiments are different, the same or similar number is assigned to facilitate the understanding of the invention.

In the following description, the vacuum pressure means any pressure state lower than the atmospheric pressure. In addition, the expression that a vacuum degree of A is higher than that of B means that a vacuum pressure of A is lower than that of B.

Figure 1:
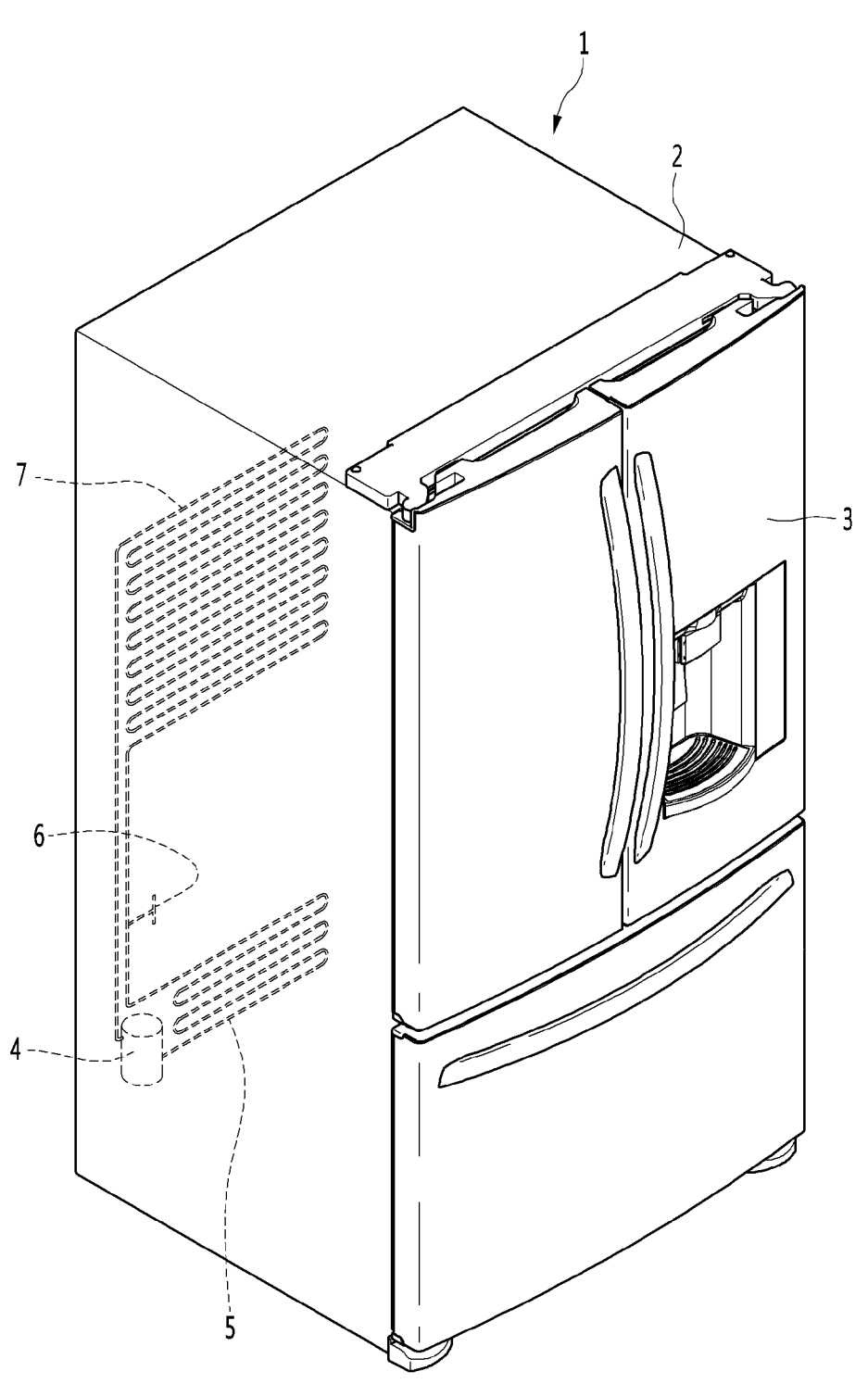
FIG. 1 is a perspective view of a refrigerator according to an embodiment.

FIG. 1 is a perspective view of a refrigerator according to an embodiment.

Referring to FIG. 1, the refrigerator 1 may include a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment and a freezing compartment.

The cavity 9 may be supplied with parts or devices of a refrigeration or a freezing cycle in which cold air is supplied into the cavity 9. For example, the parts may include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
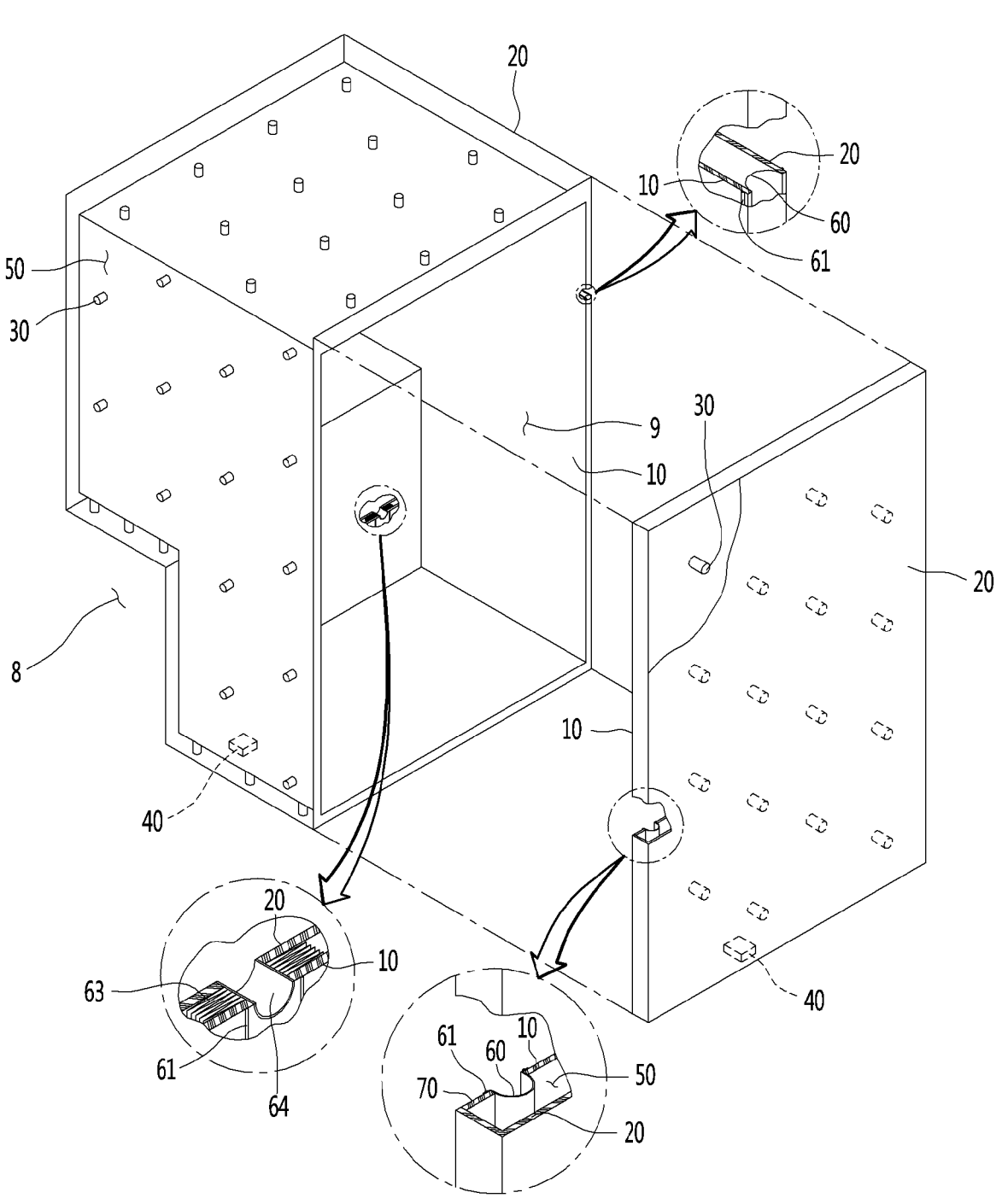
FIG. 2 is a view schematically showing a vacuum adiabatic body used in a main body and a door of the refrigerator.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an inner space of the refrigerator may be referred to as an inner case, and the second plate member 20 providing a wall of an outer space of the refrigerator may be referred to as an outer case.

A machine room 8 may include parts providing a refrigerating or a freezing cycle. The machine room 8 may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit or assembly provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3A:
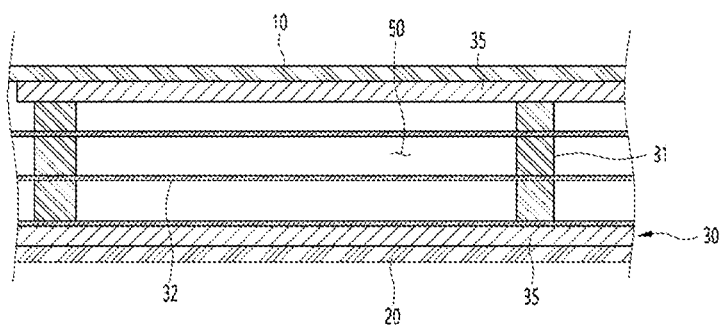
FIGS. 3A-3C are views illustrating various embodiments of an internal configuration of a vacuum space part.
Figure 3B:
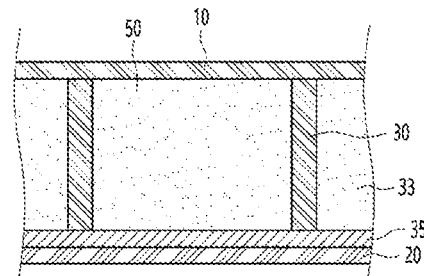

FIGS. 3A-3B are views illustrating various embodiments of an internal configuration of the vacuum space part or third space 50.

First, referring to FIG. 3A, the vacuum space part 50 may have a pressure different from that of each of the first and second spaces, preferably, a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracted in a direction in which they approach each other due to a force corresponding to a pressure difference between the first and second spaces. Therefore, the vacuum space part 50 may be deformed in a direction in which a distance between the plate members is reduced. In this case, the adiabatic loss may be caused due to an increase in amount of heat radiation, caused by the contraction of the vacuum space part 50, and an increase in amount of heat conduction, caused by contact between the plate members 10 and 20.

The supporting unit or support 30 may be provided to reduce deformation of the vacuum space part 50. The supporting unit 30 includes a bar or post 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 may have a high compressive strength so as to endure the vacuum pressure, a low outgassing rate and a low water absorption rate so as to maintain the vacuum state, a low thermal conductivity so as to reduce the heat conduction between the plate members 10 and 20. Also, the supporting unit 30 may have a secure compressive strength at a high temperature so as to endure a high-temperature exhaust process, have an excellent machinability so as to be subjected to molding, and have a low cost for molding. Here, the time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins may not be used because their outgassing rates and water absorption rates are remarkably high. Accordingly, the present inventor has examined resins that approximately satisfy conditions of the outgassing rate and the water absorption rate. As a result, polyethylene (PE) may not be used due to its high outgassing rate and its low compressive strength. Polychlorotrifluoroethylene (PCTFE) may not be used due to its remarkably high price. Polyether ether ketone PEEK may not be used due to its high outgassing rate. A resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of PC is 0.19, which is at a low level. Hence, as the time required to perform baking in which exhaustion is performed by applying heat is increased to a certain level, PC may be used as the material of the supporting unit 30.

The present inventor has found an optimal material by performing various studies on resins expected to be used inside the vacuum space part 50. Hereinafter, results of the performed studies will be described with reference to the accompanying drawings.

Figure 5:
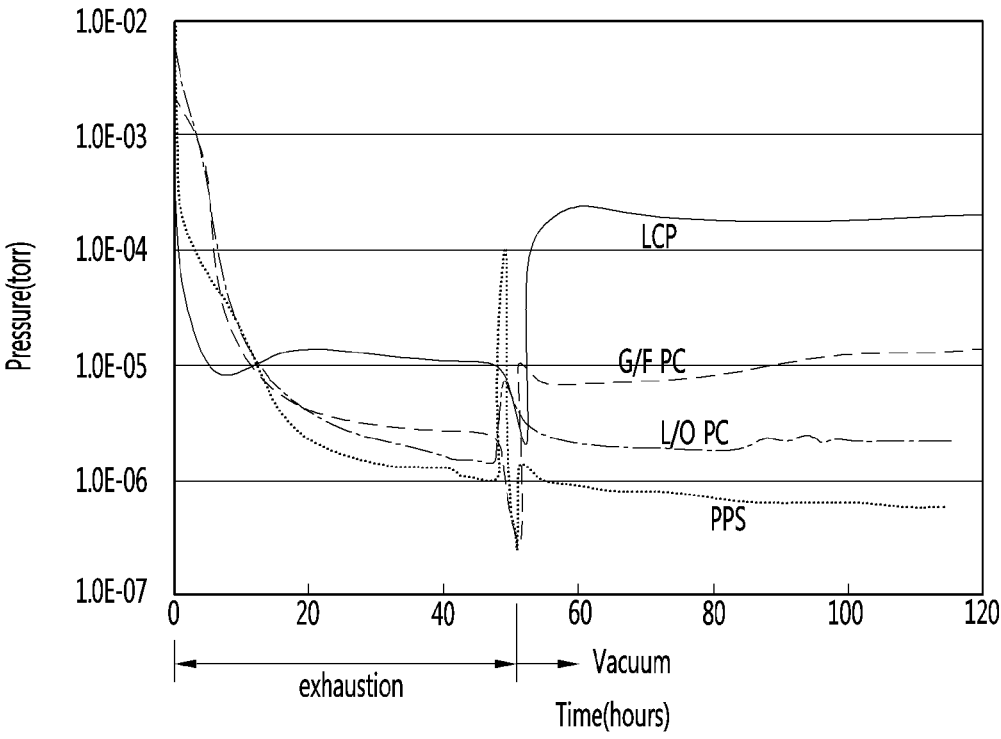
FIG. 5 illustrates results obtained by performing an experiment on vacuum maintenance performances of resins.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state where the supporting unit 30 was put in the vacuum adiabatic body, thereby measuring a vacuum maintenance performance of the supporting unit 30.

An initial exhaust performance of LCP is best, but its vacuum maintenance performance is bad. This may be caused by sensitivity of the LCP to temperature. Also, it is expected through characteristics of the graph that, when a final allowable pressure is $5 \times 10{-3}$ Torr, its vacuum performance will be maintained for a time of about 0.5 years. Therefore, the LCP may not be used as the material of the supporting unit 30.

Regarding glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance under the same conditions for a time of about 8.2 years. Therefore, PC (G/F PC) may not be used as the material of the supporting unit 30.

It is expected that, in the case of the low outgassing PC (O/G PC), its vacuum maintenance performance is excellent, and its vacuum performance will be maintained under the same conditions for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Based on the vacuum maintenance performance, PPS may be used as the material of the supporting unit 30.

Figure 6A:
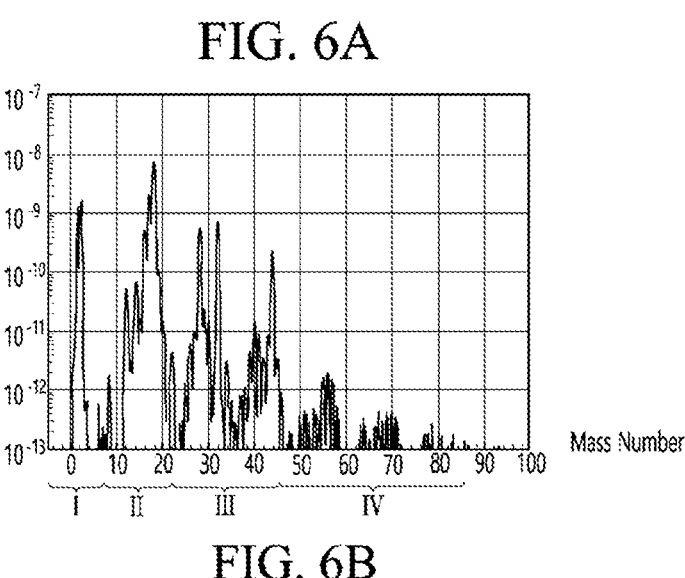
FIGS. 6A-6C illustrate results obtained by analyzing components of gases discharged from a PPS and a low outgassing PC.
Figure 6B:
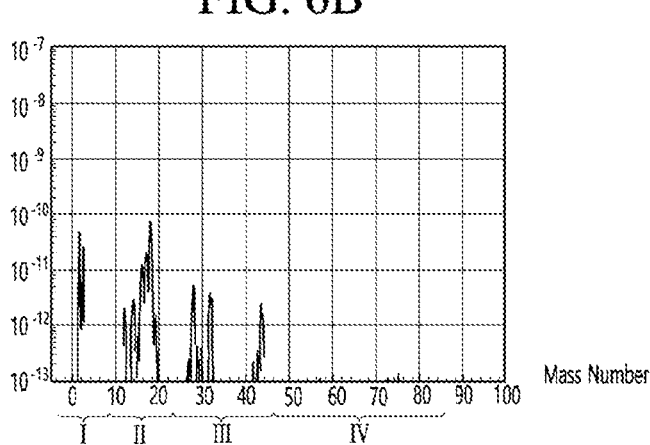
Figure 6C:
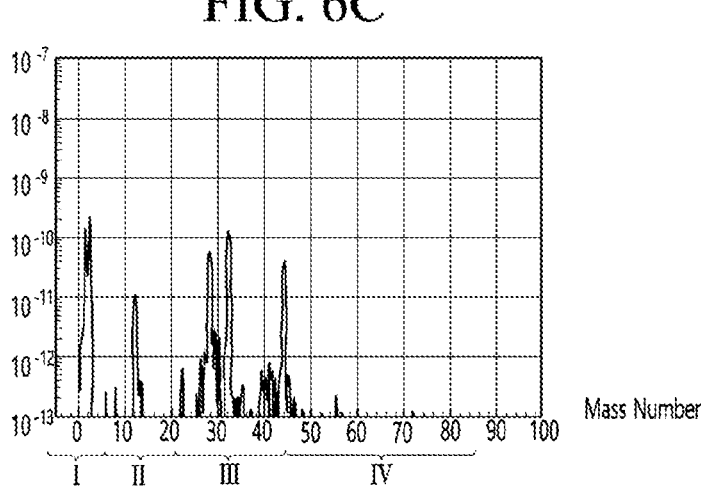

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that hydrogen or $H_2$ series (I), water or $H_2O$ series (II), dinitrogen/carbon monoxide/carbon dioxide/oxygen or $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that the $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit 30.

To further reinforce the strength of the supporting unit 30, a material added with glass fiber (G/F) of several tens %, preferably, G/F of 40% together with the PPS may be used. To more increase in strength of a PPS+G/F 40% material used in the supporting unit 30, the PPS+G/F 40% material may be further subjected to a crystallization process (left under an atmosphere of 150° C. or more for about 1 hour) as a post-treatment process after injection.

Figure 7:
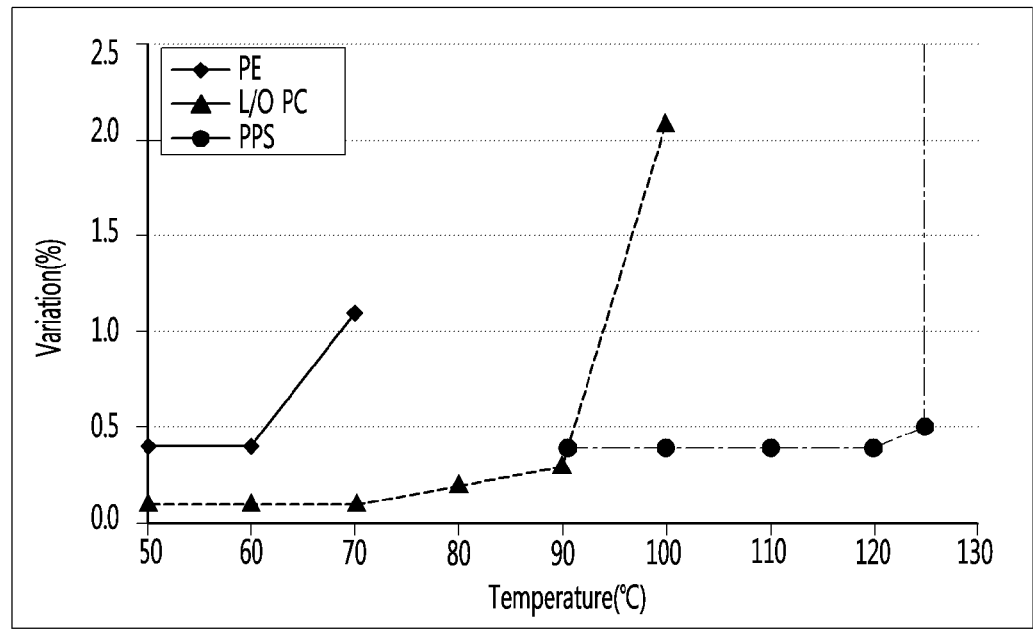
FIG. 7 illustrates results obtained by measuring maximum deformation temperatures at which resins are damaged by atmospheric pressure in high-temperature exhaustion.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS may be used as the resin used inside the vacuum space part 50. However, the low outgassing PC may be used in terms of fabrication cost.

Referring back to FIG. 3A, a radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Figure 3C:
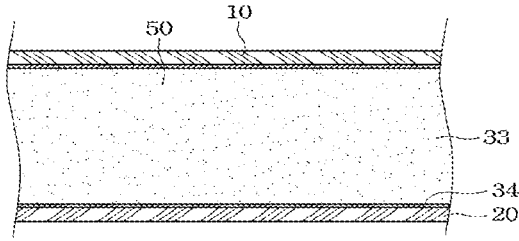

Referring to FIG. 3C the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
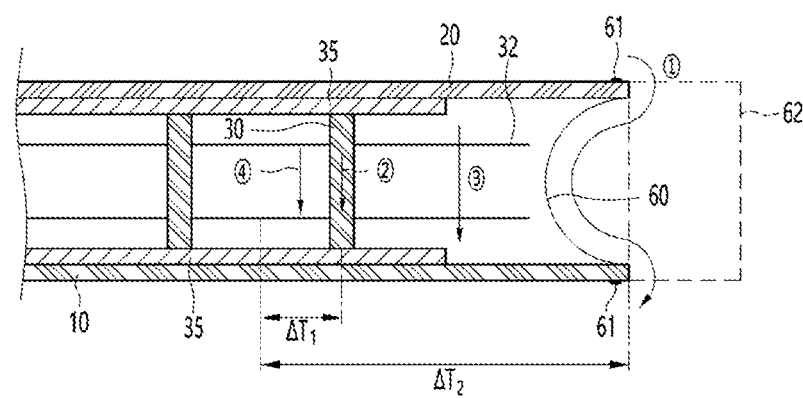
FIGS. 8A-8C are views showing various embodiments of conductive resistance sheets and peripheral parts thereof.
Figure 8B:
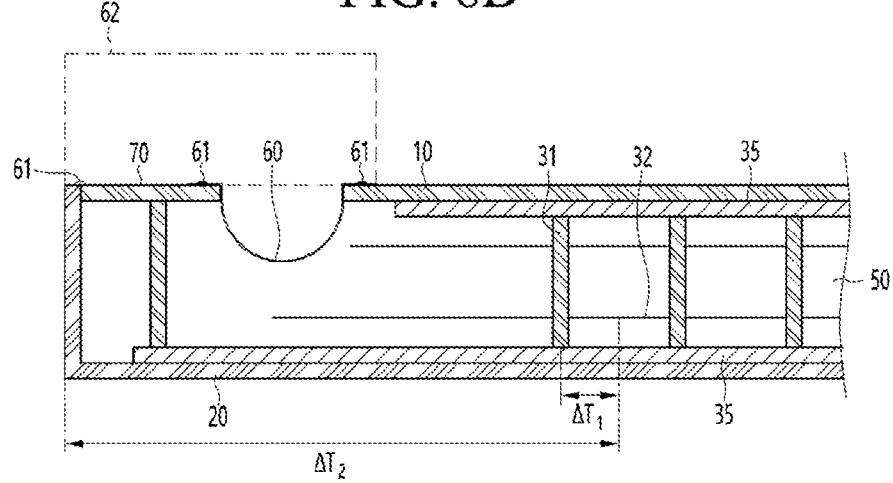
Figure 8C:
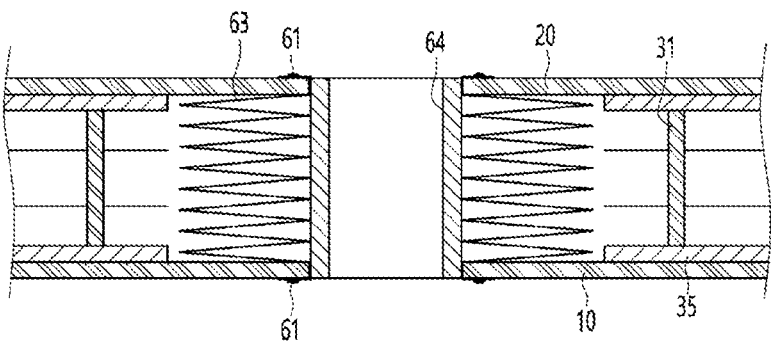

FIGS. 8A-8C are views showing various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 8A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing parts 610 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing parts 610 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member 10 and 20, so that the amount of heat conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator 1, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 8B may be applied to the door-side vacuum adiabatic body. In FIG. 8B, portions different from those of FIG. 8A are described in detail, and the same description is applied to portions identical to those of FIG. 8A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. In more detail, if the conductive resistance sheet 60 is placed at the front end portion of the vacuum space part 50, the corner edge portion of the door 3 is exposed to the exterior, and hence there is a disadvantage in that a separate adiabatic part should be configured so as to heat-insulate the conductive resistance sheet 60.

A conductive resistance sheet 63 proposed in FIG. 8C may be installed in the pipeline 64 passing through the vacuum space part 50. In FIG. 8C, portions different from those of FIGS. 8A and 8b are described in detail, and the same description is applied to portions identical to those of FIGS. 8A and 8B. A conductive resistance sheet 63 having a similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \qquad \text{Equation 1}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT. Here, Q denotes a calorific value (W) and may be obtained using a calorific value of a heater. A denotes a sectional area (m²) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ④ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m²) of a certain level may be preferably used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or a defective vacuum adiabatic body later.

The supporting unit 30 may be a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

Figure 9:
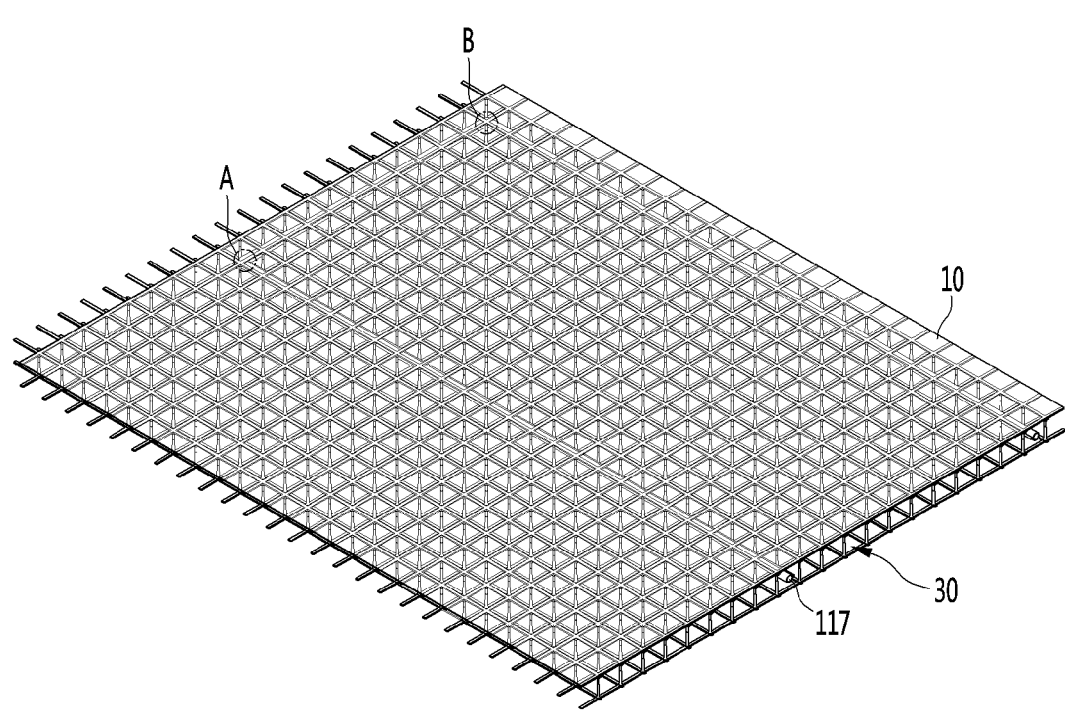
FIG. 9 is a partial cutaway view of the vacuum adiabatic body.

Referring to FIG. 9, a heat exchange pipeline is provided in the internal space of the vacuum adiabatic body, i.e., the vacuum space part 50. The heat exchange pipeline 117 may be provided by boning an inlet pipe 171 through which the refrigerant is introduced into an evaporator provided in the refrigerator 1 to an outlet pipe 172 through which the refrigerant is discharged from the evaporator. Two pipelines that are the inlet pipe 171 and the outlet pipe 172 may be bonded or coupled to each other through welding to comprise the heat exchange pipeline 117. The inlet pipe 171 may be provided inside of the outlet pipe 172. The refrigerant flowing through the inlet pipe 171 and the outlet pipe 172 may be heat-exchanged with each other to improve efficiency of a refrigeration cycle.

Hereinafter, a technique for supporting the position of the heat exchange pipeline 117 in the vacuum space part 50 will be described.

Figure 10:
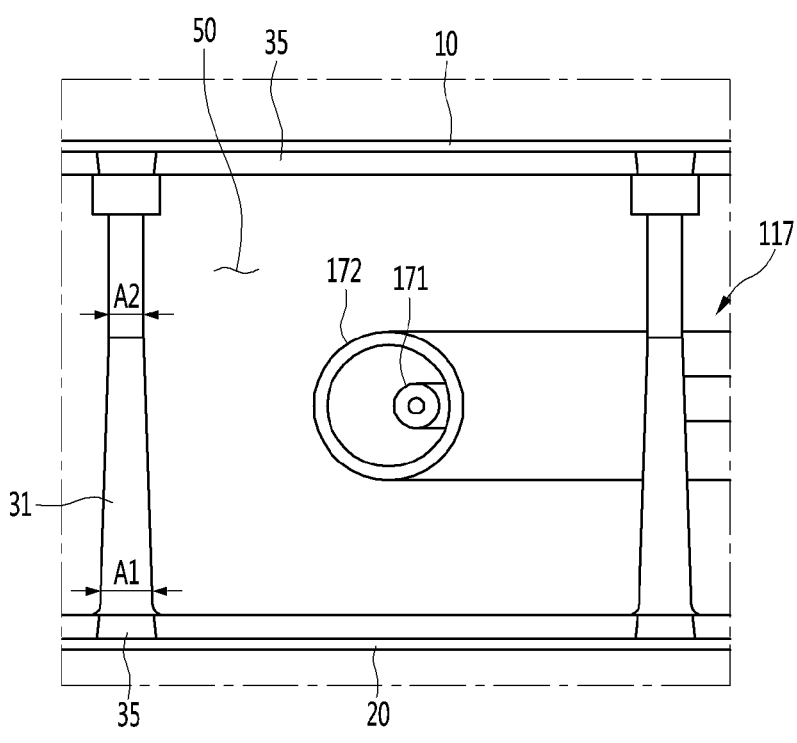
FIG. 10 is a view illustrating a state in which a heat exchange pipeline is provided in the vacuum space part.

FIG. 9 is a partial cutaway view of the vacuum adiabatic body, and FIG. 10 is a view illustrating a state in which the heat exchange pipeline is provided in the vacuum space part.

Referring to FIGS. 9 and 10, the supporting unit 30 is provided between the plate members 10 and 20. The supporting unit 30 includes a support panel or plate 35 contacting the plate members 10 or 20 and at least two or more bars 31 preferably, a plurality of bars 31 maintaining a gap between the plate members 10 and 20.

Each of the bars 31 may have a conical or tapered shape such that a lower portion may have a greater cross-sectional area A1 than a cross-sectional area A2 of an upper portion thereof in the drawing. As a result, high molding processability may be secured.

The heat exchange pipeline 117 may avoid contact with other members in the vacuum space part 50 as much as possible. When a pipeline made of a metal, for example, copper contacts the other member, heat exchange efficiency may be deteriorated due to thermal conduction, and thus, the adiabatic performance may not be realized. For example, when the bar 31 and the heat exchange pipeline 117 contact each other, a heat loss or transfer may occur. Alternatively, when the plate member 10 and/or 20 and the heat exchange pipeline 117 contact each other, bonding between metals may cause a quick heat loss or transfer.

As illustrated in the drawing, the heat exchange pipeline 117 is provided in the inner space of the vacuum space part 50. A portion of the heat exchange pipeline 117, which is withdrawn from the inside to the outside of the vacuum space part 50 passes through the first plate member 10 and the second plate member 20.

In the vacuum adiabatic body according to an embodiment, inlet/outlet end portions of the heat exchange pipeline 117 may pass one portion of the first plate member 10 and one portion of the second plate member 20. That is, only one point or area of each of the plate members 10 and 20 may be opened to be penetrated. Thus, inconvenience of work for providing a plurality of through-parts or openings may be eliminated, and the heat loss through the through-part may be reduced. In addition, since the number of through-parts that have to be sealed through a separate manner may be reduced, a possibility of vacuum breakage or deterioration of the vacuum space part 50 may be reduced.

Figure 11:
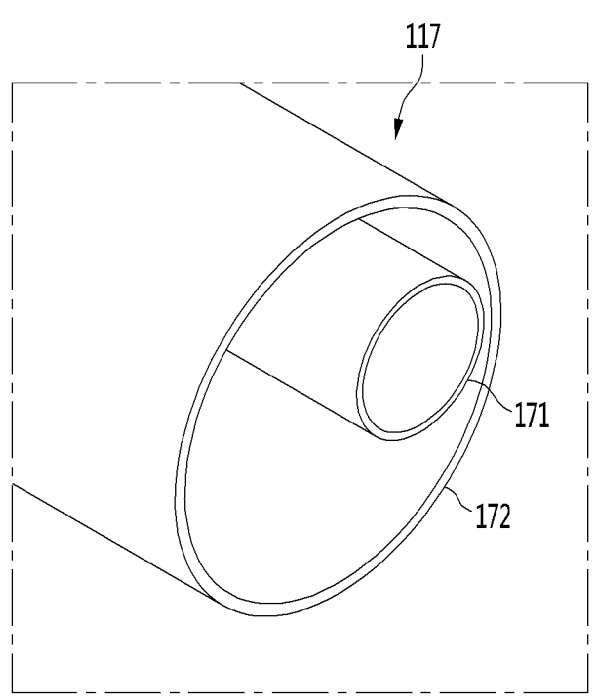
FIG. 11 is a partial cutaway view of the heat exchange pipeline according to an embodiment.

FIG. 11 is a partial cutaway view of the heat exchange pipeline according to an embodiment.

Referring to FIG. 11, in the heat exchange pipeline 117, an inlet pipe 171 having a smaller diameter may be provided in the outlet pipe 172 having a larger diameter. As described above, the refrigerant discharged after passing through the evaporator may flow through the outlet pipe 172, and the refrigerant to be introduced into the evaporator may flow through the inlet pipe 171.

A heat exchange area of the heat exchange pipeline 117, in which the heat exchange of the refrigerant is performed, may be inside of the outlet pipe 172. Thus, since it is unnecessary to perform a separate operation such as welding for promoting the heat exchange between the inlet pipe 171 and the outlet pipe 172, the manufacturing process may be convenient. Furthermore, since the gas generated in the welding part is generated in the beginning, the gas to be introduced into the vacuum space part 50 may be removed.

The heat exchange pipeline 117 according to an embodiment is in a state in which the inlet pipe 171 and the outlet pipe 172 are not branched or separated from the through-part or opening of each of the plate members 10 and 20. That is, a single pipeline 117 may pass through the plate members 10 and 20. Thus, since a separate or additional branch of the pipeline 117 in the through-part is unnecessary, ]a bent portion to avoid interference with the bar 31 may not be provided, and the pressure loss of the refrigerant flowing through the pipeline 117 may be reduced.

Hereinafter, a portion at which the heat exchange pipeline 117 passes through each of the plate members 10 and 20 will be described in more detail.

Figure 12:
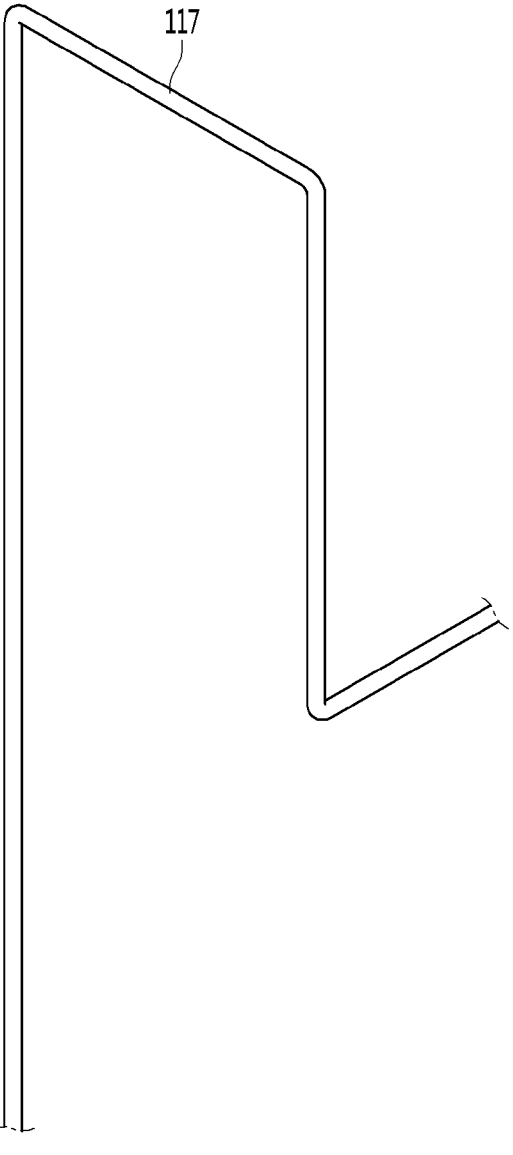
FIG. 12 is a view illustrating a state in which the heat exchange pipeline is placed in the vacuum space part.

FIG. 12 is a view illustrating a state in which the heat exchange pipeline 117 is placed in the vacuum space part 50.

Referring to FIGS. 9 and 12, the heat exchange pipeline 117 is provided in the inner space of the vacuum space part 50 provided at a rear surface of the refrigerator 1. The heat exchange pipeline 117 may pass through the first plate member 10 via a single through-part or opening and pass through the second plate member 20 via a single through-part or opening.

The heat exchange pipeline 117 may have a first portion passing through the second plate member 20 so as to be guided to a machine room 8 (FIG. 2) and a second portion passing through the first plate member 10 so as to be guided to the evaporator within the refrigerator. The heat exchange pipeline 117 may pass through each of the plate members 10 and 20 by the single through-part.

The first portion of the heat exchange pipeline 117 may be linearly withdrawn without being bent in the extension direction thereof. On the other hand, the second portion of the heat exchange pipeline 117 may be withdrawn at an angle of about 90 degrees toward the inside of the refrigerator.

Figure 13A:
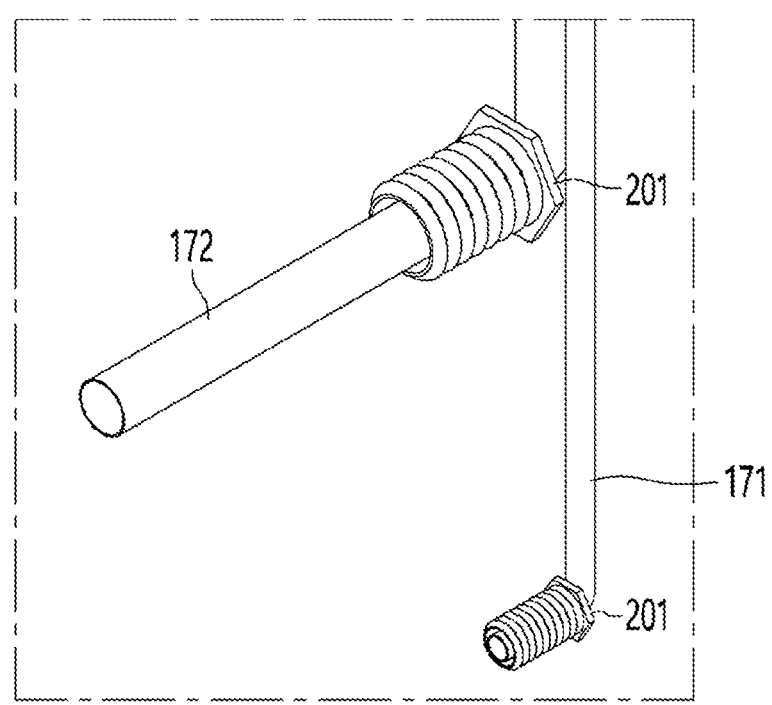
FIGS. 13A and 13B are views illustrating a portion of the heat exchange pipeline that is withdrawn to the inside of the refrigerator.
Figure 13B:
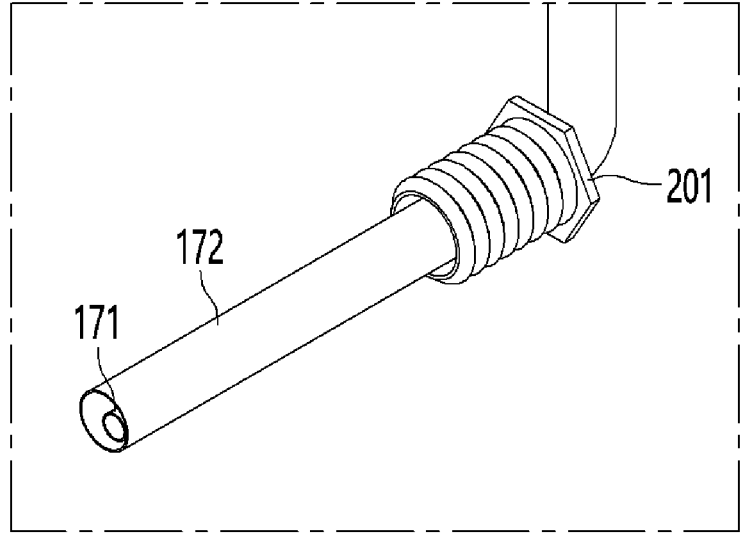
Figure 14A:
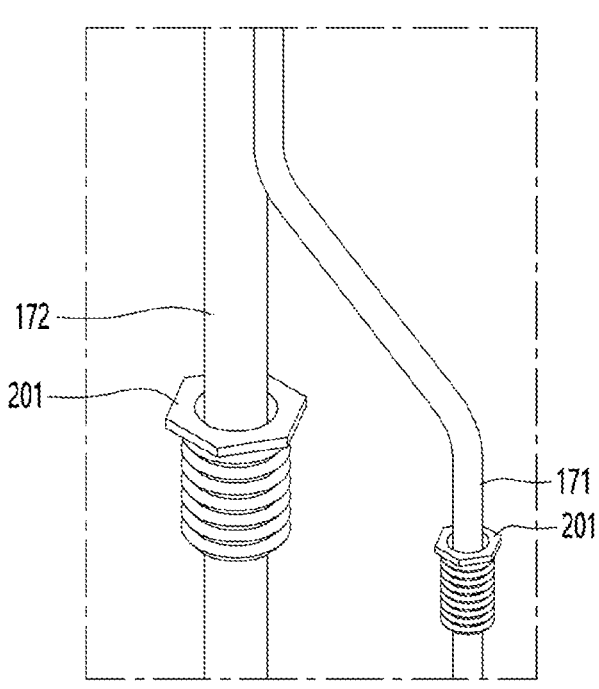
FIGS. 14A and 14B are views illustrating a portion of the heat exchange pipeline that is withdrawn to the outside of the refrigerator.
Figure 14B:
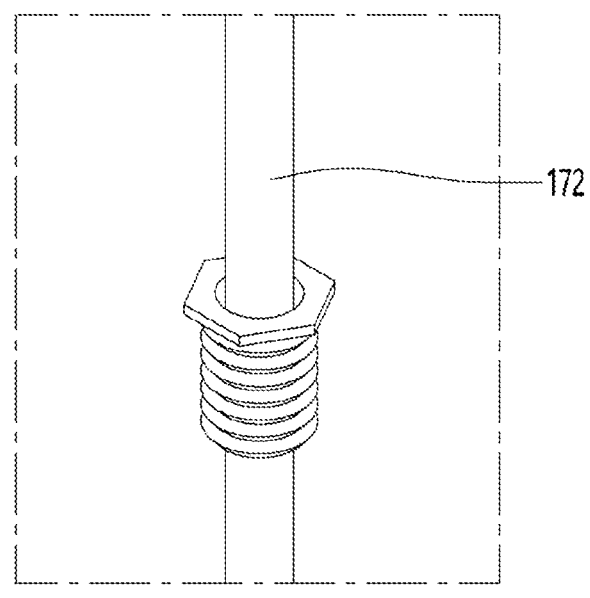

FIGS. 13A and 13B are views illustrating the second portion of the heat exchange pipeline 117 that is withdrawn to the inside of the refrigerator, and FIGS. 14A and 14B are views illustrating the first portion of the heat exchange pipeline that is withdrawn to the outside of the refrigerator, i.e., the machine room 8. FIGS. 13A-B and 14A-B illustrate an advantage according to an embodiment in comparison to the technical according to the related art, in which the inlet pipe 171 and the outlet pipe 172 are welded to each other.

Referring to FIG. 13A, each of the inlet pipe 171 and the outlet pipe 172, which are branched into two parts according to the related art, may pass through the first plate member 10 at a through-part or opening assembly 201. The pipelines 171 and 172 that individually pass through the two through-parts 201 are guided into the evaporator within the refrigerator. Thus, since the pipeline area in which the heat exchange occurs is reduced unless the branched inlet 171 and outlet pipes 172 are bonded to each other, there is a disadvantage in that the heat exchange pipeline provided in the vacuum space part 50 has to increase in length to realize sufficient heat exchange.

Referring to FIG. 13B, in this embodiment, the inlet pipe 171 may pass through the first plate member 10 as it is in the state of being provided in the outlet pipe 172 without being branched. Thus, the heat exchange pipeline 117 may be guided to the evaporator within the refrigerator by passing through a single through-part or opening assembly 201. Thus, since the inlet pipe 171 and the outlet pipe 172 are maintained in the bonded or coupled state, the heat exchange operation of the heat exchange pipeline 117 may be continuously performed even after being withdrawn to the inside of the refrigerator, and thus, the heat exchange pipeline 117 may decrease in length.

According to the comparison drawings of FIGS. 13A-B, the number of through-parts 201 through which the heat exchange pipeline 117 passes through the vacuum space part 50 may be reduced to reduce inconvenient work and the heat loss or transfer and also reduce destroying or interfering with a vacuum state of the vacuum space part 50. The welding part that is the contact part of the two pipelines 171 and 172 constituting the heat exchange pipeline 117 may not be exposed to the vacuum space part 50 to prevent the gas within the vacuum space part 50 from increasing, thereby improving the lifespan of the product.

Referring to FIG. 14A, each of the inlet pipe 171 and the outlet pipe 172, which are branched into two parts according to the related art, may pass through the second plate member 20 via a through-part 201. The pipelines 171 and 172 that individually pass through the two through-parts 201 are guided into the machine room 8 outside the refrigerator. Thus, since the pipeline area in which the heat exchange occurs is reduced unless the branched inlet 171 and outlet pipes 172 are bonded to each other, there is a disadvantage in that the heat exchange pipeline provided in the vacuum space part 50 has to increase in length to realize sufficient heat exchange.

In addition, the inlet pipe 171 has to be branched so as to be separated from the inlet pipe 172 so that the inlet pipe 171 passes through the through-parts 201 different from each other. In this area, since the inlet pipe 171 is sharply bent to avoid the contact with the bar 31, the pipe 171 may be narrowed and cause the unexpected pressure loss.

Referring to FIG. 14B, in this embodiment, the inlet pipe 171 may pass through the second plate member 20 as it is in the state of being provided in the outlet pipe 172 without being branched. Thus, the heat exchange pipeline 117 may be guided to the machine room 8 outside the refrigerator by passing through the single through-part 201. Thus, since the inlet pipe 171 and the outlet pipe 172 are maintained in the state of being bonded to each other, the heat exchange operation of the heat exchange pipeline 117 may be continuously performed even after being withdrawn to the outside of the refrigerator, and thus, the heat exchange pipeline 117 may decrease in length.

According to the comparison drawings of FIG. 14A-B, the number of through-parts 201 through which the heat exchange pipeline 117 passes through the vacuum space part 50 may be reduced to reduce inconvenient work, heat loss or transfer may be reduced, and a possibility of ruining a vacuum state of the vacuum space part 50 may be reduced. Also, the welding part that is the contact part of the inlet pipe 171 and the outlet pipe 172 may not be exposed to the vacuum space part 50 to prevent the gas within the vacuum space part 50 from increasing, thereby improving the lifespan of the product. Also, since the single pipe body, i.e., the inlet and outlet pipes 171 and 172 are directly withdrawn to the outside without the inlet pipe 171 and the outlet pipe 172 being branched from each other, the pressure loss of the refrigerant flowing through the inlet pipe 171 may be reduced.

Figure 15:
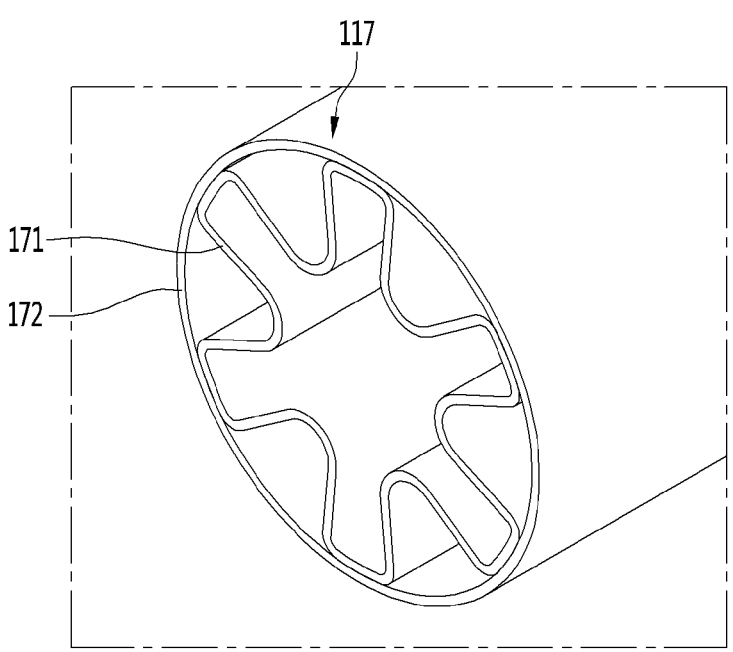
FIG. 15 is a cross-sectional view of a heat exchange pipeline according to another embodiment.

FIG. 15 is a cross-sectional view of a heat exchange pipeline according to another embodiment.

Referring to FIG. 15, an inlet pipe 171 provided in an inner space of an outlet pipe 172 may be wrinkled or have a wrinkled or ridged cross-sectional area shape. The wrinkled inlet pipe 171 may be heat-exchanged with the refrigerant within the inlet pipe 172 on a larger area. Thus, higher heat exchange efficiency may be obtained through the heat exchange pipeline 117 having the larger area.

In this embodiment, the inlet pipe 172 and a through-part 201 may be coupled to each other in a heterogeneous welding manner or a gasket coupling manner. The heterogeneous welding manner may have an advantage in that a contact surface may be completely or better sealed by the welding. However, the inlet pipe 172 is made of copper, and each of plate members 10 and 20 is made of stainless steel. Thus, since the different materials are bonded to each other through the welding, it may be difficult to perform the welding, and stability after the welding may be deteriorated.

Further another embodiment in which the above-described limitation of the heterogeneous welding is solved, and the above-described advantage of the heat exchange pipeline is realized as it is will be described below.

Figure 16:
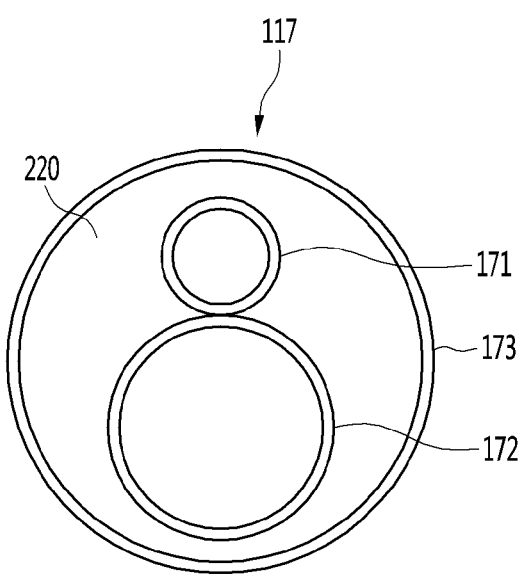
FIG. 16 is a cross-sectional view of a heat exchange pipeline according to further another embodiment.

FIG. 16 is a cross-sectional view of a heat exchange pipeline according to further another embodiment.

Referring to FIG. 16, in a heat exchange pipeline 117 according to this embodiment, an inlet pipe 171 and an outlet pipe 172 contact each other in a manner such as welding. The inlet pipe 171 may be adjacent to, rather than inside of, the outlet pipe 172. Thus, the inlet pipe 171 and the outlet pipe 172 may be smoothly heat-exchanged with each other. The inlet pipe 171 and the outlet pipe 172 may be accommodated in a sealing member or material 173 in the state of being bonded or coupled to each other. The sealing member 173 may have a predetermined strength and be made of stainless steel that is the same material as each of the plate members 10 and 20.

The sealing member 173 may be coupled to each of the plate members 10 and 20 in a homogeneous welding manner. As described above, since the metals made of the same material are bonded to each other through the welding, the bonding strength of the two members may be improved because the metals made of the same material are bonded to each other through the welding. Thus, the manufacturing work may be convenient, the coupling of the heat exchange pipeline, and reliability in sealing between the plate members may be improved.

Also, it is possible to prevent the plate members 10 and 20 made of stainless steel and a refrigerant pipe made of copper or aluminum material from being welded to each other so as to obtain workability with the plate members 10 and 20 made of stainless steel in order to obtain sufficient rigidity. That is to say, the heterogeneous welding according to the related art may be replaced by the homogeneous welding between the sealing member 173 and the plate members 10 and 20.

According to the sealing member 173, the number of positions at which the welding is required may be reduced to better reduce leakage.

A filler or spacer 220 is filled into the sealing member 173. The filler 220 may be filled into a spacing part between an outer surface of each of the inlet pipe 171 and the outlet pipe 172 and an inner surface of the sealing member 173. The filler 220 may include porous materials such as foamed polyurethane, glass fiber, etc. The outer surface of each of the inlet pipe 171 and the outlet pipe 172 may not directly contact the inner surface of the sealing member 173 by the filler 220. In this case, the heat exchange loss that is dissipated to the outside, particularly, the sealing member 173 itself may be reduced. In addition, since the inlet pipe 171 and the outlet pipe 172 do not contact external outer members, for example, the plate members 10 and 20, heat of the inlet pipe 171 and the outlet pipe 172 may not be transferred to the outside. Thus, heat exchange efficiency of each of the inlet pipe 171 and the outlet pipe 172 may be improved.

The filler 220 may not be provided as a separate material but be provided by heat insulation using air or vacuum.

The insulation effect through the vacuum insulation and the air insulation may be less than that in the foregoing embodiment in which the filler 220 is separately provided. Also, it may be difficult to fix the positions of the inlet pipe 171 and the outlet 172 pipe.

According to this embodiment, like the embodiment described with reference to FIG. 11, the number of through-parts through which the pipeline 117 passes through the vacuum space part 50 may be reduced to reduce the inconvenient work and the heat loss by half, thereby reducing a possibility of ruining a vacuum state of the vacuum space part. Also, the welding part that is a contact part of two pipelines 171 and 172 constituting the heat exchange pipeline 117 may not be exposed to the vacuum space part 50 to prevent an amount of gas within the vacuum space part 50 from increasing. Also, since it is unnecessary to branch the inlet and outlet pipes 171 and 172 so as to pass through separate through-parts, a pressure loss of the refrigerant may be reduced.

According to this embodiment, since the heat exchange pipeline 117 and the plate members 10 and 20 are bonded to each other through the homogeneous welding when the heat exchange pipeline 117 and the plate members 10 and 20 are coupled to each other, the work may be convenient, and the reliability of the coupling and the sealing maintenance may be improved.

In this embodiment, since the inlet pipe 171 and the outlet pipe 172 are sealed inside the sealing member 173, the entire bending process of the heat exchange pipeline 117 may be difficult. For example, when the inlet pipe 171 and the outlet pipe 172 are provided inside and outside a curvature center of the bent portion at the bent portion of the heat exchange pipeline 117 within the vacuum space part 50, i.e., when the curvature centers of the inlet pipe 171 and the outlet pipe 172 are the same, but the curvature radii are different from each other, larger stress may be applied to the pipeline or sealing member 173 provided outside the inlet pipe 171 and the outlet pipe 172.

In this case, the larger stress applied to the pipeline provided outside the inlet pipe 171 and the outlet pipe 172 may cause damage of the corresponding pipeline and damage of the welded portion. This limitation may be more pronounced due to the different diameters of the inlet pipe 171 and the outlet pipe 172, which are suitable for the flow of the refrigerant.

In this embodiment, to solve the above limitation occurring by the curvature radii of the different pipelines, a relative arrangement relationship between the inlet pipe 171 and the outlet pipe 172 may be provided inside the sealing member 173. The arrangement relationship between the inlet pipe 171 and the outlet pipe 172 will be described in more detail by changing the drawing.

Figure 17:
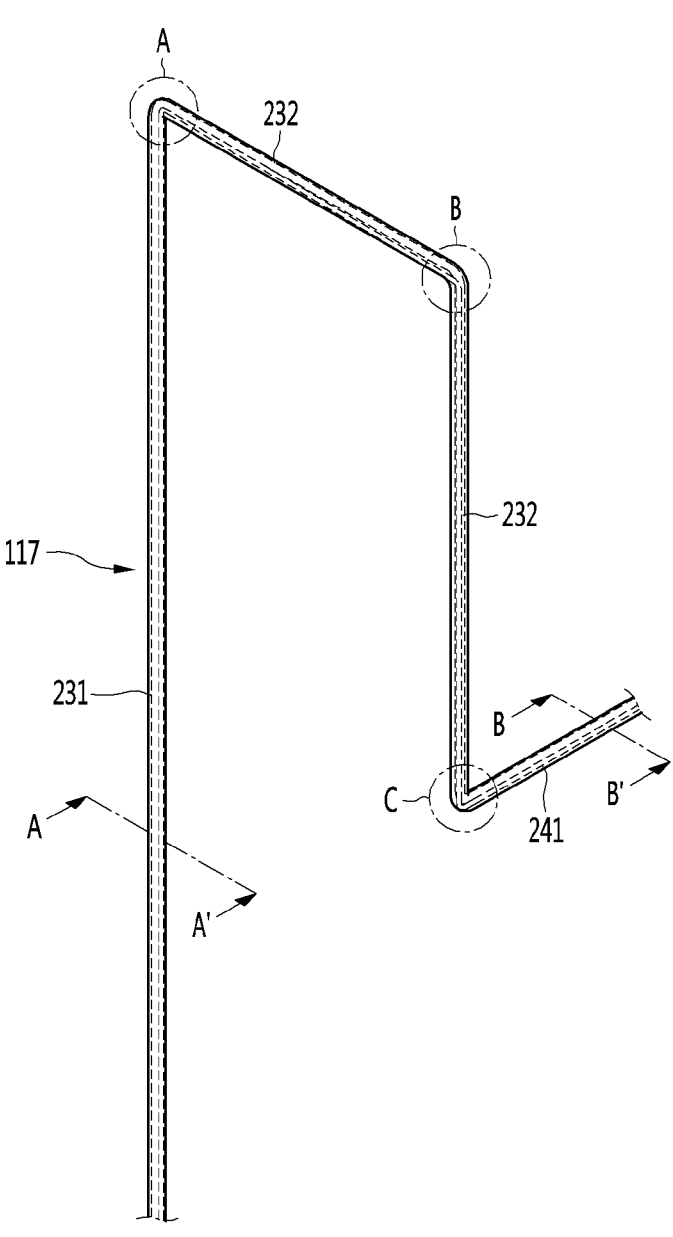
FIG. 17 is a view of a heat exchange pipeline according to further another embodiment.

FIG. 17 is a view of a heat exchange pipeline according to further another embodiment.

Referring to FIG. 17, an overall extension direction of a heat exchange pipeline 117 is similar to that of FIG. 12.

The heat exchange pipeline 117 may pass through a first plate member 10 via a single through-part and pass through a second plate member 20 via the single through-part.

The portion passing through the second plate member 20 may be linearly withdrawn without being bent in a direction in which the heat exchange pipeline 117 extends. The portion passing through the first plate member 10 may be withdrawn at an angle of about 90 degrees in a direction in which the heat exchange pipeline 117 is directed to the inside of the refrigerator.

As described above, according to the extension direction of the heat exchange pipeline 117, the heat exchange pipeline 117 may have a three-dimensional extension direction within a vacuum space part 50. In detail, three extension directions or portions 231, 232, and 233 may be defined within the same plane that is the same as the extension direction of a plane by which the vacuum space part 50 is provided. A fourth extension direction or portion 241 extending from the third extension direction 233 to the inside of the refrigerator, i.e., the direction passing through the first plate member 10 extends in a direction crossing or perpendicular to the plane but does not extend to the inside of the two-dimensional plane by which the vacuum space part 50 is provided. The fourth extension direction 241 may not be provided on the same plane of the first, second, and third extension directions 231, 232, and 233.

To prevent the inlet pipe 171 and the outlet pipe 172 from being damaged in the extension direction of the heat exchange pipeline 117, the inlet pipe 171 and the outlet pipe 172 may have the same curvature radius at a bending part or portion of the heat exchange pipeline 117. In FIG. 17, the bending parts are expressed by reference symbols A, B, C, respectively.

The bending parts A, B, and C will be described in more detail with reference to FIGS. 18 and 19.

Figure 18:
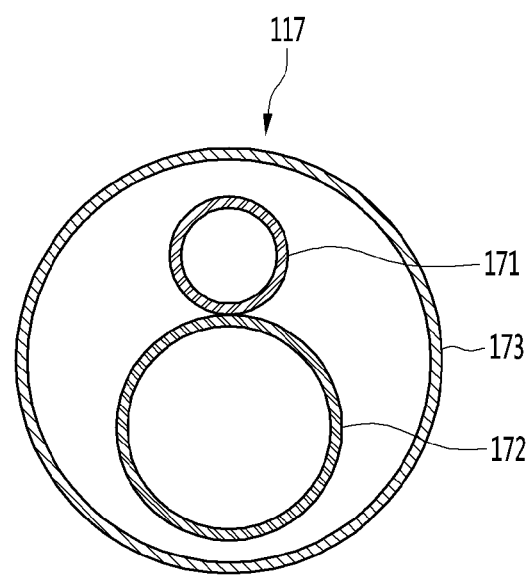
FIG. 18 is a cross-sectional view taken along line A-A' of FIG. 17.
Figure 19:
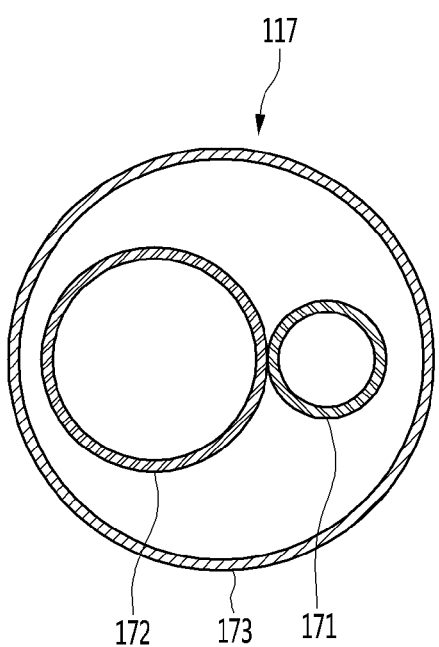
FIG. 19 is a cross-sectional view taken along line B-B' of FIG. 17.

FIG. 18 is a cross-sectional view taken along line A-A' of FIG. 17, and FIG. 19 is a cross-sectional view taken along line B-B' of FIG. 17.

Referring to FIGS. 17 and 18, the inlet pipe 171 and the outlet pipe 172 may be vertically provided in the sealing member 173. This arrangement may be maintained until passing through the bending parts A, B, and C. The bending may occur at least at right sides with respect to FIG. 18.

According to the arrangement of the inlet pipe 171 and the outlet pipe 172, since the inlet pipe 171 and the outlet pipe 172 have the same curvature radius at the bending parts A, B, and C, the damage of the bending parts A, B, C at each of the pipelines 171 and 172 and the bonded portions of the pipelines 171 and 172 may be prevented.

However, when the arrangement of the pipelines of FIG. 18 is maintained up to the bending part C, the curvature radii of the inlet pipe 171 and the outlet pipe 172 may be different from each other. That is to say, one of the pipelines, which is provided at a far side with respect to the curvature radius of the bending part C is bent at a large curvature radius. One of the pipelines, which is provided at a close side with respect to the curvature radius is bent at a small curvature radius. Thus, the pipeline itself or the bonded portion of the pipeline may be damaged.

Referring to FIGS. 17 and 19, the inlet pipe 171 and the outlet pipe 172 are provided in a horizontal direction, respectively. The arrangement of the pipelines 171 and 172 may be understood as being previously completed before reaching the bending part C. That is to say, the arrangement of the pipelines 171 and 172 may rotate at an angle of about 90 degrees before reaching the bending part C from the bending part B. For example, the inlet pipe 171 may be provided to rotate at an angle of about 90 degrees in a clockwise direction as illustrated in FIG. 19.

When the pipelines are horizontally provided as illustrated in FIG. 19, even though the heat exchange pipeline 117 is bent from the third direction 233 to the fourth direction 241, the curvature radii of the inlet pipe 171 and the outlet pipe 172 may be equally maintained. Thus, the curvature radii may be the same to prevent the pipelines 171 and 172 and the bonded portion of the pipelines 171 and 172 from being damaged even though the bending parts are provided.

Figure 20:
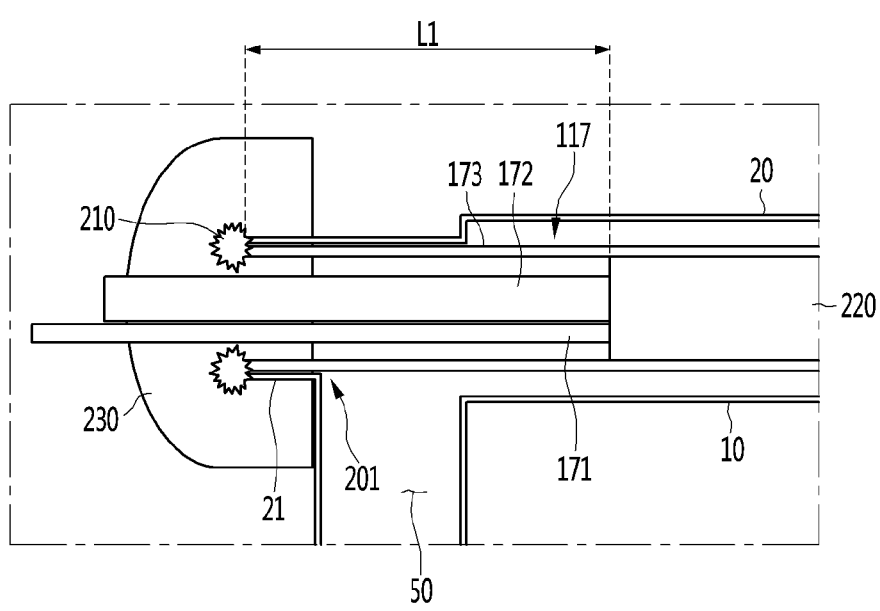
FIG. 20 is a cross-sectional view of a position at which the heat exchange pipeline passes through a second plate member.

FIG. 20 is a cross-sectional view of a position at which the heat exchange pipeline passes through the second plate member 20.

Referring to FIG. 20, the inlet pipe 171 and the outlet pipe 172 may be provided in the sealing member 173, and the filler 220 is filled into the sealing member 173 so that the inlet pipe 171 and the outlet pipe 172 do not contact with an inner surface of the sealing member 173. Alternatively, although it is possible to use vacuum and air instead of the filler 220, the filler 220 may be filled to prevent the heat transfer between the inlet pipe 171 and the outlet pipe 172, prevent cold air from leaking, and block vibration and noise propagated through the pipeline 117.

The through-part 201 will be described.

The second plate member 20 and the sealing member 173 may be welded to each other. In detail, an inner surface of the penetrated portion of the second plate member 20 and an outer surface of the sealing member 173, which is withdrawn to the outside of the refrigerator by passing through the second plate member 20, may be welded to each other. In this case, since the second plate member 20 and the sealing member 173 are made of the same material such as stainless steel and thus welded to each other in a homogeneous welding manner, welding reliability and lifespan may be improved. In the drawing, the reference numeral 210 represents a homogeneous welding part.

Heat may be generated from the homogeneous welding part 210. The heat may be conducted along the sealing member 173 to burn the filler 220. To solve this limitation, a predetermined width L1 may be provided between an end portion at which the filler 220 is provided and the homogeneous welding part 210. The width may have a length of about 5 cm. Thus, when the welding is performed, the burning of the filler 220 due to the heat transfer may be prevented.

To improve contact reliability of the welding part 210, a protrusion end portion 21 protruding from the second plate member 20 may be provided with a predetermined length. To provide the protrusion end portion 21, the shape of the second plate member 20 may be deformed in width or thickness.

After the homogeneous welding is performed, the homogeneous welding part 210 may be covered by a finishing member or cover 230. The finishing member 230 may not need to have a function such as the vacuum maintenance, and it may be only necessary to prevent moisture from being permeated. Thus, the finishing member 230 may be made of rubber or sealant that is resistant to the moisture.

The structure illustrated in FIG. 20 may be applied as a similar configuration even at the position in which the heat exchange pipeline 117 passes through the first plate member 10.

INDUSTRIAL APPLICABILITY

According to the embodiments, since the heat exchange pipeline provided in the vacuum space part is withdrawn to the outside of the vacuum space part without the heat loss while reducing the possibility of the vacuum breakage, a high industrial effect due to the rapid application may be expected.

In more detail, there are the effects of reducing the heat loss or transfer due to the reduction of the number of through-parts or openings, improving the convenience of the work, and reducing the fear of vacuum breakage. Also, since the gas generation due to the welding material used for the welding of the two pipelines of the heat exchange pipeline may be prevented, the vacuum maintenance effect may be obtained.

Also, the pressure loss of the refrigerant may be prevented or reduced by reducing the number of bending parts of the pipeline. Also, it may be possible to perform the homogeneous welding, thereby improving the reliability at the inlet and outlet pipes of the heat exchange pipeline.

What is claimed is:

1. A vacuum adiabatic body, comprising:
a first plate;
a second plate, a vacuum space being provided between the first plate and the second plate;
an opening formed through the first plate; and
a pipeline passing through the opening and configured to guide a flow of fluid, the pipeline extending from an inside of the vacuum space and into another space outside of the vacuum space,
wherein the pipeline includes a first pipe and a second pipe contacting each other in at least one of the vacuum space or the opening.

2. The vacuum adiabatic body of claim 1, further comprising a seal provided in the opening and coupled to the first plate,
wherein the pipeline passes through the seal.

3. The vacuum adiabatic body of claim 2, wherein a material of the pipeline is different from a material of at least one of the first plate or second plate, and
wherein a material of the seal corresponds to the material of the at least one of the first plate or second plate, and the seal is coupled to the first plate through homogeneous welding.

4. The vacuum adiabatic body of claim 2, further comprising a protrusion that protrudes from the first plate and defines the opening,
wherein the protrusion protrudes towards the other space outside the vacuum space and is coupled to the seal, and wherein the pipeline passes through the protrusion.

5. The vacuum adiabatic body of claim 4,
wherein a section of the pipeline extends from a coupling region of the protrusion and the seal and to the other space outside the vacuum space.

6. The vacuum adiabatic body of claim 2, further comprising a cover positioned to shield a coupling region of the seal and the first plate, and
wherein the pipeline passes through the cover.

7. The vacuum adiabatic body of claim 2, further comprising a filler provided within the seal to surround the pipeline and to be positioned between the pipeline and the seal, the filler including a porous material.

8. The vacuum adiabatic body of claim 1, further comprising an additional opening formed through the second plate,
wherein the pipeline passes through the opening in the first plate and the additional opening in the second plate.

9. The vacuum adiabatic body of claim 1,
wherein the second pipe is provided within the first pipe.
10. The vacuum adiabatic body of claim 1,
wherein the opening consists of a single opening through
which both the first and second pipes pass.
11. The vacuum adiabatic body of claim 1,
wherein the first pipe and the second pipe have a bent
section that is bent, and
wherein a cross-section of the first pipe and the second
pipe is aligned in a first direction before the bent section
and is aligned in a second direction different from the
first direction after the bent section to prevent the bent
section from being damaged.
12. The vacuum adiabatic body of claim 1,
wherein the first pipe is coupled to an inlet side of an
evaporator; and
wherein the second pipe is coupled to an outlet side of the
evaporator and positioned to contact the first pipe.
13. A vacuum adiabatic body, comprising:
a first plate;
a second plate, a vacuum space being provided between
the first plate and the second plate;
an opening formed through the first plate;
a pipeline passing through the opening, the pipeline
including a first section provided within the vacuum
space and a second section provided inside the opening
of the first plate; and
a tube surrounding the first section and the second section
of the pipeline and including a portion coupled to the
first plate.
14. The vacuum adiabatic body of claim 13,
wherein the first pipeline includes a first pipe and a second
pipe that allow fluid to flow inside the first pipe and the
second pipe, and
wherein the first pipe contacts the second pipe inside the
opening.
15. The vacuum adiabatic body of claim 13,
wherein the pipeline includes a first pipe and the second
pipe, and wherein at least one of the first plate or the second plate
extends in a first direction, and
wherein each of the first pipe and the second pipe includes
a section extending in the first direction.
16. The vacuum adiabatic body of claim 13,
wherein the pipeline includes a first pipe and the second
pipe, and
wherein at least one of the first plate or the second plate
extends in a first direction,
wherein each of the first pipe and the second pipe includes
a section extending in a second direction that is differ-
ent from the first direction.
17. The vacuum adiabatic body of claim 13, wherein the
pipeline includes a first pipe and the second pipe, and
wherein the second pipe includes a wrinkled section that
contacts the first pipe at multiple locations.
18. A vacuum adiabatic body, comprising:
a first plate;
a second plate, a vacuum space being provided between
the first plate and the second plate;
an opening formed through the first plate;
a pipeline including a first section provided within the
vacuum space, a second section provided inside the
opening of the first plate, and a third section provided
outside the vacuum space; and
a tube including a portion to receive the first section, the
second section, and the third section of the pipeline, the
tube including a portion directly coupled to the first
plate.
19. The vacuum adiabatic body of claim 13, wherein the
portion of the tube includes a distal end of the tube.
20. The vacuum adiabatic body of claim 13, wherein the
pipeline includes a first pipe having a first center and a
second pipe provided within the first pipe and having a
second center, wherein the first center is eccentric with
respect to the second center.

\* \* \* \* \*